US009310186B2

(12) United States Patent
Abdulhalim et al.

(10) Patent No.: US 9,310,186 B2
(45) Date of Patent: Apr. 12, 2016

(54) TRUE-SPECTROSCOPIC DUAL MODE HIGH RESOLUTION FULL-FIELD OPTICAL COHERENCE TOMOGRAPHY USING LIQUID CRYSTAL DEVICES (71) Applicant: BEN-GURION UNIVERSITY OF THE NEGEV RESEARCH AND DEVELOPMENT AUTHORITY, Beer Sheva (IL)

(72) Inventors: Ibrahim Abdulhalim, Neve Shalom (IL); Avner Safrani, D.N. Jezreel Valley (IL)

(73) Assignee: Ben-Gurion University of the Negev Research and Development Authority, Beer Sheva (IL)

( * ) Notice: Subject to any disclaimer, the term of this patent is extended or adjusted under 35 U.S.C. 154(b) by 1 day.

(21) Appl. No.: 14/395,552

(22) PCT Filed: Apr. 15, 2013

(86) PCT No.: PCT/IL2013/050326
§ 371 (c)(1),
(2) Date: Oct. 20, 2014

(87) PCT Pub. No.: WO2013/160890
PCT Pub. Date: Oct. 31, 2013

(65) Prior Publication Data
US 2015/0109623 A1    Apr. 23, 2015

Related U.S. Application Data (60) Provisional application No. 61/636,760, filed on Apr. 23, 2012.

(51) Int. Cl.
*G01B 9/02*    (2006.01)
(52) U.S. Cl.
CPC .......... *G01B 9/02091* (2013.01); *G01B 9/0203* (2013.01); *G01B 9/02004* (2013.01);
(Continued)

(58) Field of Classification Search
CPC ... G01J 3/2823; G02B 21/14; G01B 9/02091; G01B 9/02044; G01B 9/02011
USPC .......................................... 356/479, 497, 495
See application file for complete search history.

(56) References Cited

U.S. PATENT DOCUMENTS 4,818,110 A    4/1989    Davidson
5,194,918 A    3/1993    Kino
(Continued)

FOREIGN PATENT DOCUMENTS

FR    2943145 A1    9/2010

OTHER PUBLICATIONS

D. Huang, E. A. Swanson, C. P. Lin, J. S. Schuman, W. G. Stinson, W. Chang, M. R. Hee, T. Flotte, K. Gregory, C. A. Puliafito, J. G. Fujimoto, "Optical Coherence Tomography", Science, 254, 1178-1181 (1991).
(Continued)

*Primary Examiner* — Jonathan Hansen
(74) *Attorney, Agent, or Firm* — Roach Brown McCarthy & Gruber, P.C.; Kevin D. McCarthy (57) ABSTRACT

The invention is a system and method for obtaining interference and optical coherence tomography images from an object. The system comprises a wideband source, an optical mask for extending the depth of field, a a liquid crystal tunable filter and a phase modulator all of which are uniquely integrated in a Linnik interferometer microscope. The system has several imaging modes: in the time domain mode the device may operate either with wideband illumination or with quasi monochromatic illumination. The monochromatic illumination can be varied in wavelength along a wide spectral region thus allowing true spectroscopic imaging in high resolution and with high speed. Due to the liquid crystal tunable filter and the optical mask, the frequency domain mode is also accessible. The method of obtaining the optical coherence tomography images, both in the time and in the frequency domains, using the liquid crystal retarder is described in detail.

11 Claims, 7 Drawing Sheets

(52) U.S. Cl.
CPC ........ *G01B9/02011* (2013.01); *G01B 9/02083* (2013.01); *G01B 2290/40* (2013.01); *G01B 2290/50* (2013.01); *G01B 2290/70* (2013.01)

(56) References Cited

U.S. PATENT DOCUMENTS

| | | | |
|---|---|---|---|
| 6,940,602 | B2 | 9/2005 | Dubois |
| 7,088,454 | B2 | 8/2006 | Chang |
| 7,095,503 | B2 | 8/2006 | Kim |
| 7,468,799 | B2 | 12/2008 | de Groot |
| 7,950,801 | B2 | 5/2011 | Lacombe |
| 7,978,346 | B1 * | 7/2011 | Riza ........................ G01B 11/24 356/368 |
| 2008/0231807 | A1 | 9/2008 | Lacombe |
| 2009/0153876 | A1 * | 6/2009 | Chan ........................ A61B 3/102 356/521 |
| 2011/0181888 | A1 | 7/2011 | Abdulhalim |
| 2013/0107275 | A1 | 5/2013 | Boccara |

OTHER PUBLICATIONS

P.H Tomlins and R.K Wang, "Theory, developments and applications of optical coherence tomography," J. Phys. D: Appl. Phys. 38, 2519-2535 (2005).
Johannes F. de Boer, Barry Cense, B. Hyle Park, Mark C. Pierce, Guillermo J. Tearney, and Brett E. Bouma, "Improved signal-to-noise ratio in spectral-domain compared with time-domain optical coherence tomography", Opt. Lett., 28, 2067-2069 (2003).
W. Drexler, U. Morgner, F. X. Kartner, C. Pitris, S. A. Boppart, X. D. Li, E. P. Ippen, and J. G. Fujimoto, "In vivo ultrahigh-resolution optical coherence tomography", Opt. Lett, 24, 1221-1223 (1999).
B. Povazay, K. Bizheva, A. Unterhuber, B. Hermann, H. Sattmann, A. F. Fercher, and W. Drexler, A. Apolonski, W. J. Wadsworth, J. C. Knight, and P. St. J. Russell, M. Vetterlein and E. Scherzer "Submicrometer axial resolution optical coherence tomography", Opt. Lett. 27, 1800-1802 (2002).
L. Vabre, A. Dubois and A. C. Boccara, "Thermal-light full-field optical coherence tomography", Opt. Lett., 27, 530-532 (2002).
A. Dubois, K. Grieve, G. Moneron, R. Lecaque, L. Vabre and C. Boccara, "Ultrahigh-resolution full-field optical coherence tomography", App. Opt., 43, 2674-2883 (2004).
Spectropolarimetric method for optic axis, retardation, and birefringence dispersion measurement, Optical Engineering, 48(5), Safrani A; Abdulhalim I, May 30, 2009.
H. Kakuma, K. Ohbayashi, Y. Arakawa, "Optical imaging of hard and soft dental tissues using discretely swept optical frequency domain reflectometry optical coherence tomography at wavelengths from 1560 to 1600 nm", Journal of Biomedical Optics, 13, 014012-1-014012-6 (2008).
Y. Watanabe, M. Sato "Three-dimensional wide-field optical coherence tomography using an ultrahigh-speed CMOS camera", Opt. Comm., 281, 1889-1895 (2008).
P. de Groot, X. Colonna de Lega, "Signal modeling for low-coherence height-scanning interference microscopy," Appl. Opt. 43, 4821-4830 (2004).
E. Beaurepaire, A. C. Boccara, M. Lebec, L. Blanchot, and H. Saint-Jalmes, "Full-field optical coherence microscopy," Opt. Lett. 23, 244-246 (1998).
A. Safrani, I. Abdulhalim, "Spatial coherence effect on layers thickness determination in narrowband full field optical coherence tomography", App. Opt., 50, 3021-3027 (2011).
M. Davidson, K. Kaufman, I. Mazor, and F. Cohen, "An application of interference microscopy to integrated circuit inspection and metrology," in Integrated Circuit Metrology, Inspection, and Process Control, K. M. Monahan, ed., Proc. SPIE 775, 233-247 (1987).
G. S. Kino and S. S. C. Chim, "Mirau correlation microscope," App. Opt. 29, 3775-3783 (1990).
D. Gale, M. I. Pether, and J. C. Dainty, "Linnik microscope imaging of integrated circuit structures," Appl. Opt. 35, 131-148 (1996).
L. Vabre, A. Dubois, A. C. Boccara, "Thermal-light full-field optical coherence tomography", Opt. Lett., 27, 530-532 (2002).
A. Dubois, L. Vabre, A. C. Boccara, E. Beaurepaire, "High-resolution full-field optical coherence tomography with a Linnik microscope", App. Opt., 41, 805-812 (2002).
M. Akiba, K. P. Chan, and N. Tanno, "Full-field optical coherence tomography by two-dimensional heterodyne detection with a pair of CCD cameras", Opt. Lett., 28, 816-818 (2003).
G. Moneron, A. C. Boccara, and A. Dubois, "Stroboscopic ultrahigh-resolution full-field optical coherence tomography", Opt. Lett., 30, 1351-1353 (2005).
Y. Watanabe, Y. Hayasaka, M. Sato, N. Tanno, "Full-field optical coherence tomography by achromatic phase shifting with a rotating polarizer", App. Opt., 44, 1387-1392 (2005).
G. Moneron, A. C. Boccara, A. Dubois, "Polarization-sensitive full-field optical coherence tomography", Opt. Lett., 32, 2058-2060 (2007).
M. Kinoshita, M. Takeda, H. Yago, Y. Watanable, and T. Kurokawa, "Optical frequency-domain imaging microprofilometry with a frequency-tunable liquid-crystal Fabry-Perot etalon device," Appl. Opt. 38, 7063-7068 (1999).
B. Považay, A. Unterhuber, B. Hermann, H. Sattmann, H. Arthaber, W. Drexler "Full-field time-encoded frequency-domain optical coherence tomography", Opt. Exp., 14, 7662-7669 (2006).
S. K. Dubey, T. Anna, C. Shakher, D. S. Mehta, "Fingerprint detection using full-field swept-source optical coherence tomography", App. Phs. Lett., 91, 181106-181106-3 (2007).
S. K. Dubey, D. S. Mehta, A. Anand, C. Shakher,"Simultaneous topography and tomography of latent fingerprints using full-field swept-source optical coherence tomography", J. Opt. A, 10, 015307 (2008).
T. Bonin, G. Franke, M. H. Eggert, P. Koch, G. Hüttmann1, "In vivo Fourier-domain full-field OCT of the human retina with 1.5 million A-lines/s", Opt. Lett., 35, 3432-3434 (2010).
Yu and Kim, "Full-color three-dimensional microscopy by wide field optical coherence tomography", Optics Express Dec. 27, 2004.
Communication and Supplementary European Search Report from a counterpart foreign application—EP 13 78 1879—9 pages, mailed Dec. 18, 2015.
Safrani et al., Ultrahigh-resolution full-field optical coherence tomography using spatial coherence gating and quasi-monochromatic illumination, Optics Letters, vol. 37, No. 4, Feb. 15, 2012, pp. 458-460.
Mehta et al., Scientific and Engineering Applications of Full-field Swept-source Optical Coherence Tomography, Journal of the Optical Society of Korea, vol. 14, No. 3, Sep. 2009, pp. 341-348.

* cited by examiner

TRUE-SPECTROSCOPIC DUAL MODE HIGH RESOLUTION FULL-FIELD OPTICAL COHERENCE TOMOGRAPHY USING LIQUID CRYSTAL DEVICES

FIELD OF THE INVENTION

The invention is related to the field of optical imaging. In particular the invention is related to three dimensional imaging and its applications in the inspection of industrial processes, medical diagnostics and research.

BACKGROUND OF THE INVENTION

Publications and other reference materials referred to herein, including reference cited therein, are incorporated herein by reference in their entirety and are numerically referenced in the following text and respectively grouped in the appended Bibliography which immediately precedes the claims.

Optical coherence tomography (OCT) is a 3D imaging method mainly associated with the production of high resolution cross sectional images of semi-transparent samples. The development of OCT and its applications to the biomedical optical imaging field are increasing every day. The main principles of OCT rely on light temporal coherence and interference, matter reflectivity and high sensitivity which are used to measure micro morphology of objects inside a turbid environment. Since its first appearance two decades ago [1], many technological schemes have been suggested to fulfill its goal [2]. However, despite their great diversity most OCT systems can be categorized into two main groups, time domain (TD) and frequency domain (FD) OCT. In principle, FD-OCT systems are faster, have higher signal to noise ratio (SNR) and better sensitivity [3], but hold lower resolution capabilities.

The key parameters of all OCT systems are resolvability (axial and lateral/transverse resolution), penetration capability, sensitivity and speed. Among all of the OCT techniques, the femto second pulse laser (fs-OCT) [4, 5] and time domain full field OCT systems (TD-FF-OCT) [6, 7] have been found to demonstrate the highest, sub-cellular, resolution capabilities.

Although state of the art fs-OCT systems demonstrate a higher sensitivity they are much more expensive and lack the extremely high lateral resolution and speed obtainable by TD-FF-OCT systems.

In most of the OCT modalities the axial resolution of the system is controlled by the source coherence length and, in some cases can be made as short as 1 µm [5, 7]. The lateral resolution of the system is controlled by the point spread function (PSF) of the focusing lens and theoretically can be made as high as ~0.5 µm. The penetration capability is controlled mostly by the medium scattering and absorbing characteristics, but can be partially controlled by the central wavelength of the source; in some OCT systems it may be as great as ~12 mm [9]. Due to the heterodyne natural amplification of the interferometer, the sensitivity can be extremely high, in some reported works as high as −110 dB [4], allowing detection of $10^{-11}$ of the incident optical power. The imaging speed in OCT is primarily controlled by the hardware and the imaging method used. In some recently reported works, 2.6×2.6× 1.2 $mm^3$ volumes were captured at 4 volumes per second, corresponding to ~393 M pixels/s [10]. The above mentioned characteristics are what make this young imaging technique so appealing to so many different fields of research.

The main advantages of TD-FF-OCT are its extremely high 3D resolution, speed, simplicity and cost. In TD-FF-OCT the light source is comparatively cheap (halogen or xenon lamp) with very low coherence length. The method can use a high NA objective lens and therefore achieves very high resolution also in the transverse direction. The optical detection is made by a parallel detector CCD/CMOS (CCD—Charge Coupled Device; CMOS—Complementary Metal Oxide Semiconductor) camera so that enface images are obtained without parallel scanning the sample. The parallel detection simplifies the entire microscopy system and reduces production costs. TD-FF-OCT systems do not use any dynamic depth of focusing compensation techniques, as opposed to all other OCT methods. The TD-FF-OCT configuration allows real time en-face images, both interference and bright field; therefore, TD-FF-OCT systems may be used also as conventional optical microcopy system without additional optics.

However, in TD-FF-OCT the investigated sample is scanned by using a motorized linear stage, which is limited by speed and, like all mechanical systems, produces vibration noise. As in all OCT systems, the fact that wideband illumination is used to obtain high axial resolution forces the application of dispersion compensation techniques which in turn complicates the entire system architecture. In addition, when using a dry objective lens with high numerical aperture (NA), the interference signal contrast is severely eroded [11] and as a result the SNR and the sensitivity are reduced. Furthermore, the fact that the OCT signal extraction is done by mechanically actuating the reference mirror/objective limits both the accuracy and the lifetime of the microscope. Since traditional TD-FF-OCT systems use wideband illumination to achieve high axial resolution, true spectroscopic OCT imaging is not possible.

The time domain full field optical coherence tomography method, occasionally referred to as time domain full field optical coherence microscopy (TD-FF-OCM), is a rather new modality of OCT technology. Indeed, the first work on TD-FF-OCT was published only in 1998 [12], seven years after the concept of OCT was successfully demonstrated [1]. TD-FF-OCT is a more sophisticated version of the full field low coherence interference microscopy (FFLCIM), a method which is known for much longer time [13-16].

The first published work on FF-OCT [12] used the Taylor (sometime referred to as "Michelson") interference microscopy configuration which in today's jargon is sometimes termed 'wide field' OCT (WF-OCT), for it holds a wider imaging field but a lower resolution capabilities. The axial resolution in [12] is governed by the source coherence length, which is 16 µm. The lateral resolution is determined by the objective lens NA and the CCD pixel size. The light emanating from the source (LED) is polarized, collimated and split at a polarized beam splitter. Two orthogonal field components are thus focused (by a 0.25 NA objective lens), one to the reference mirror and the other to the sample. By using a photo elastic modulator, a time dependent phase delay up is introduced between the two orthogonal signals. By successively grabbing four images with suitable phase difference the signal interference envelope is obtained. Due to the polarizer and the analyzer configuration, half of the reflected power is lost.

In 2002 the above method was employed with the Linnik interference microscope configuration, demonstrating much higher resolution capabilities [17-18]. In this work the optical light source was a halogen lamp with 260 nm Full Width at Half Maximum (FWHM) spectra centered at 840 nm wavelength. The wideband source allowed a 1.2 µm FWHM for the longitudinal resolution. The microscope objective lens NA was 0.3, providing a 1.3 µm lateral resolution at the center wavelength. The CCD camera operated in 200 fps and a piezoelectric ceramic material PZT (lead zirconate titanate (Pb[Zr(x)Ti(1−x)]O3)) was used for position modulating the reference arm at a rate of 50 Hz. Here, instead of using a photo elastic modulator, a PZT was used in order to demodulate the interference signal. It was reported, however, that the signal extraction was not ideal (fringes were still apparent). Also, due to the wideband spectra, the lateral resolution was somewhat limited as defocusing effects were stronger. As in all OCT systems with mechanically oscillating mirrors and continuous phase modulation, inertia problems and integration time drifts are also inherent here.

Wide field OCT (WF-OCT) was also demonstrated in high speed using a heterodyne detection scheme [19] by employing two CCD cameras (100 fps), however due to the long coherence length of the source SLD (Super Luminescent Diode) with 18 nm FWHM spectra centered at 826 nm wavelength) and the comparatively low NA objective lens (NA=0.14), both the lateral and the axial resolution were not very high (4 µm×17 µm, transverse×axial). In this technique the in phase ($\phi=0$) and quadrature ($\phi=\pi/2$) components of the interference signal are grabbed simultaneously at two different cameras (the phase delay is introduced via two liquid crystal (LC) shutters operating in $\pi/2$ delay). The DC level is known prior to image acquisition. Therefore real time enface imaging is obtained and the OCT cross section image is produced in 0.6 mm/s with measured 85 dB sensitivity. The concept of two cameras was also employed in ultrahigh resolution [20]; however, here as well, the demodulating means were mechanical. In general, using two cameras for high speed OCT is problematic as it means that a considerable effort must be put in order to align the two CCDs; a pixel to pixel alignment is required for accurate demodulation.

WF-OCT was also performed with real color by using three different color LEDs having their wavelength centered in the blue, green and red regions, 457.4 nm (FWHM=28.6 nm), 528.5 nm (FWHM=33.2 nm) and 638.4 nm (22.9 nm), respectively [21]. The envelope of the interference signal is extracted by position-modulating the reference mirror, thereby inducing four quadruplet signals (simple combination of the four signals results in the envelope signal). However, due to the large temporal coherence length of the source and the low objective lens NA, both the lateral and the axial resolution were not very high (15 µm×5 µm, transverse× axial). TD-FF-OCT was also applied with a rotatable polarizer phase shifter [22]. The phase shifter used to produce three images with three different phases by which the amplitude of the signal is extracted in similar fashion to the four quadruplet technique. Polarization sensitive OCT (PS-OCT) was also illustrated recently in the full field form [23]. In PS-FF-OCT, in addition to the traditional intensity en-face image representation a phase-retardation image is produced, which provides another level of information that may be useful to biological applications and clinician's observations.

The Fourier domain full field optical coherence tomography technique (FD-FF-OCT) is another interesting form of OCT technology which holds several advantages over the TD-FF-OCT. The FD-FF-OCT is a more sophisticated version of its predecessor the Fourier domain wide field optical coherence reflectometry, a method usually applied to surface profilometry [24]. Two major advantages are attributed to the FD form of FF-OCT: (i) it possesses very high SNR and (ii) it does not require any moving mechanical elements, neither for transverse nor for axial scanning.

However, its main disadvantages are (i) the requirements for frequency profile reshaping prior to Fourier transform (FT) operation, which slightly reduces the speed; (ii) twin image removal, which either limits the speed by elaborate computation or requires more sophisticated hardware; (iii) high extended depth of focus is required, which limits the lateral resolution; (iv) its comparatively narrowband tuning range, which limits the axial resolution; (v) its limited frequency spacing, which limits the optical imaging depth; and (vi) the requirement for having the entire wavelength image collection prior to OCT cross sectional image representation. Yet, the fact that in principle no moving parts are needed to perform 3D OCT imaging attracts a few groups of scientists to try and circumvent the above mentioned limitations.

Not many studies have been published on the FD-FF-OCT mode. As opposed to the conventional FD-OCT the FF form has only one applicable form. There are two fundamental techniques to perform FD-OCT, the spectral domain OCT (SD-OCT) and the swept source OCT (SS-OCT). In the case of FF-OCT, only the swept source configuration has been demonstrated (SS-FF-OCT).

The first, and one of the only high resolution, sub cellular, SS-FF-OCT works was published only in 2006 [25]. In this work a wide spectral source is obtained by pumping a Ti-Sapphire gain medium with a Nd:YAG laser. The wide gain bandwidth of the Ti-Sapphire laser produces a FWHM spectrum of 110 nm centered at 790 nm wavelength. The output spectrum is then tuned over almost the entire bandwidth with spectral spacing (line width) of 0.4 nm by a following acoustic optic modulator (AOM). The light is then coupled into multimode optical fiber (MMF) equipped with a suitable mode mixer which eliminates spackles. By controlling the wavelength transmitted by the AOM a plurality of 'time encoded' spectral images are obtained, then the inverse Fourier transform (IFT) operation is applied to the data stock and the OCT image is constructed. Due to the comparatively low NA of the objective lens and the moderate bandwidth of the spectrum used, OCT images of fruit fly eye were demonstrated with $1.3 \times 1 \times 0.2$ mm$^3$ volumes grabbed in 50 seconds and with axial by lateral resolution of 3 µm×4 µm. The fact that a femto second laser was used complicates the entire system and raises the costs. Also, this method does not overcome the problems of the twin image, the DC and coherent noises. As a result, only half of the potentially available imaging depth was employed.

SS-WF-OCT was also demonstrated for finger print detection, using Super-Luminescent Diode (SLD) in conjunction with AOM as the wavelength tuning device [26]. The SLD spectrum was only 48 nm FWHM and low NA projecting lens was used, therefore the lateral and axial resolution were not very high. A very similar work was also presented in [27]. SS-WF-OCT was very recently demonstrated in-vivo on a human retina [28] using a tunable light source with 850 nm center wavelength and effective FWHM of 25 nm with 0.05 nm line width. Both the lateral and the axial resolution were not very high (13 µm×13 µm) due to the low NA objectives and the comparatively narrow bandwidth of the source. Also in this work the problem of the twin image, the DC and the coherent noises were not overcome.

The subject of FD-FF-OCT is still a hot zone of research driven by the magical power of the Fourier transform analysis which permits 3D imaging without mechanically moving elements. However, for the time being, due to the requirement of large depth of field and the additional cost associated with the swept source this imaging modality is still, for high resolution applications, less favored than the TD-FF-OCT method.

In U.S. Pat. No. 6,940,602 (Dubois et al), a method and a system for obtaining interference images of an object are described. In this patent the interference signal is demodulated by mechanically oscillating one of the mirrors/objectives of the interference microscope. In this system the phase difference between the interference arms is changed sinusoidally and the interference signal is integrated along four time periods. By linear combination of these four phase images the phase and amplitude of the interference signal is obtained.

In U.S. Pat. No. 7,095,503 (Kim et al) a method and a system for obtaining true color OCT images using a wide field OCT (WF-OCT) configuration is depicted. The invention uses a color CCD parallel detector and a white light source. The true color OCT images are obtained by demodulating the reference arm and grabbing four phase shifted interference images of the object. The fact that the system uses the Taylor like interferometer configuration does not allow high lateral resolution images (~15 μm). Also, since the CCD color bands are limited to a relatively narrow bandwidth, the axial resolution is limited to about 5 μm. This invention also describes an alternative light source; using three different color LEDs.

In U.S. Pat. No. 7,088,454 (Chang et al) a method and a system for extracting the OCT signal from 3 different images is described. The method is exemplified using a Taylor like interferometer with a super-luminescence diode. In this method, a first non interfering image is taken and then two interference images with π/2 phase difference are grabbed. A simple mathematical combination of these images produces the OCT images. The method uses mechanical modulation of the reference arm and is not capable of operating at high resolution due to the Taylor like configuration and the comparatively moderate bandwidth of the source.

In U.S. Pat. No. 7,950,801(Lacombe et al) a method and a system for demodulating the OCT signal of a FF-OCT system in real time are presented. The invention uses a Wollaston prism to project simultaneously four spatially resolved different interference images on the same parallel detector. Although the method is very fast it uses linearly polarized light to illuminate the sample, and therefore cannot be implemented on strongly birefringent samples. In addition, the fact that each interference image requires $1/4^{th}$ of the CCD sensor area limits the available field for imaging and reduces the effectiveness of the parallel detector. Furthermore, in this method the Wollaston prism is positioned just about the objective lens and therefore produces some aberration. Additionally, the four different images on the parallel detector must be matched with great precision.

In patent application number US 2009/0153876 (Chan et al) a system and a method for obtaining FF-OCT images in high speed are disclosed. The system comprises two separated cameras by means of which it extracts the OCT signal with only two measurements. The phase shift between these measurements is imposed by mechanically oscillating the reference mirror in similar fashion to the method described above in U.S. Pat. No. 6,940,602.

In U.S. Pat. No. 4,818,110 (Davidson et al.), a method and a system for obtaining high resolution images of microelectronic objects, established on the Linnik interference microscope configuration, is disclosed. In this invention the images are obtained based on the degree of coherence of the reference and sample images. To obtain the degree of coherence, two interference images are obtained with phase difference of π. Based on the fringe intensity (in the axial direction) the image is reconstructed.

In U.S. Pat. No. 5,194,918 (Kino et al), a method for extracting the envelope of an interference image is disclosed using a Mirau correlation microscope. The method uses the Fourier/Hilbert transform operation to separate the DC level from the carrier of the interference signal. After filtering the zero order, the inverse transform operation is applied which in turn yields the envelope of the carrier, i.e. the desired envelope. In this technique the entire space must be scanned before obtaining the full-field en-face images. The method requires a large number of sampling points for high accuracy. Also, when large fields are analyzed, the computation process is long. Therefore, this method is rather slow.

In U.S. Pat. No. 7,468,799 (de Groot et al), a method of obtaining the interference image pattern of a thin film and of microelectronic samples is disclosed. The method is demonstrated using the Mirau and the Linnik scanning interferometers and is established on the fringe pattern obtained by axially scanning the sample, no demodulating means are described.

In patent application number US 2011/0181888A1 from Jul. 28, 2011, a Fourier domain wide field optical coherence tomography system with an extended depth of field is disclosed. The invention uses phase masks such as an annular phase mask which produces a π/2 phase shift on light passing the annular region. The mask is positioned in at least one of the microscope interference arms. Optionally the phase mask is positioned on one of the surfaces of the objective lens. Although the invention is applicable to OCT in general it mainly describes a wide field OCT (WF-OCT) system. This configuration allows only comparatively low resolution.

SUMMARY OF THE INVENTION

Figure 1:
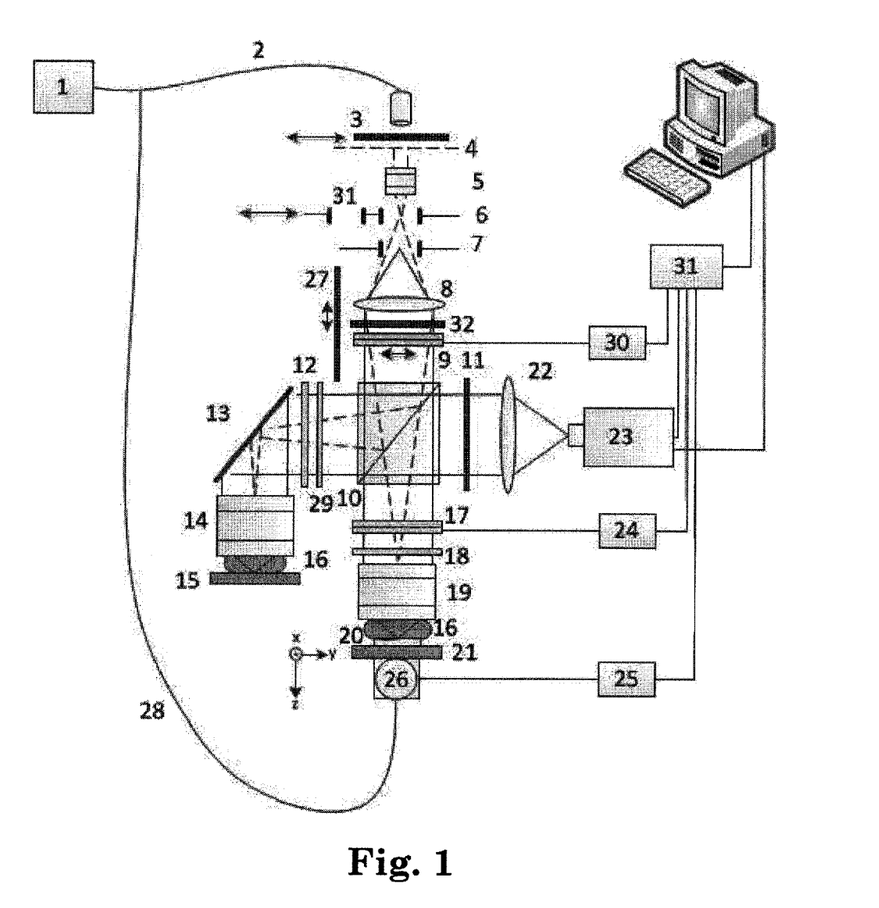
FIG. 1 is a schematic representation of one optional configuration of the microscopy system within the framework of the Linnik interferometer microscope.
Figure 2:
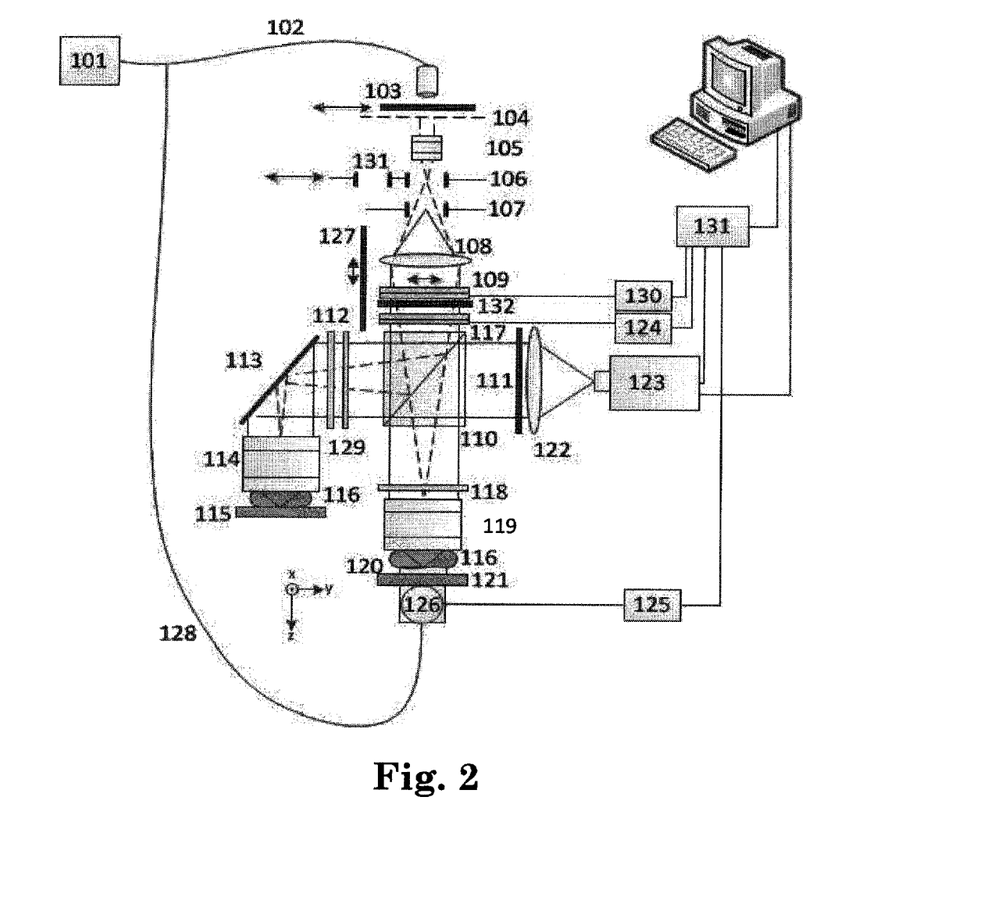
FIG. 2 is a schematic representation of a second optional configuration of the microscopy system within a frame work of the Linnik interferometer microscope.

In a first aspect the invention is an interference microscopy three dimensional imaging system comprising:
a) a light source 1,101;
b) a diffuser 4,104 adapted to diffuse light received from the light source 1,101;
c) a condenser lens 5,105 adapted to condense diffused light received from diffuser 4,104;
d) one of an aperture stop 6,106 or an optical mask 31,131 adapted to extend the depth of field of the objective lenses 14,114 and 19,119 of a sample arm and a reference arm of said system respectively;
e) a field stop 7,107;
f) a projecting lens 8,108 adapted to image one of aperture stop 6,106 or optical mask 31,131 the back aperture planes of objective lenses 14,114 and 19,119 and to image field stop 7,107 to the plane of the object 20,120 and to the plane of reference mirror 15,115;
g) a linear polarizer 32,132 adapted to polarize the light transmitted through projecting lens 8,108;
h) a liquid crystal tunable filter 9,109 adapted to receive light that has passed through linear polarizer 32,132;
i) a first voltage supply unit 30,130 adapted to control liquid crystal tunable filter 9,109;
j) a beam splitting device 10,110 adapted to split the light passing through tunable filter 9,109 into two beams;
k) an achromatic quarter wave plate 12,112 and 18,118 in the reference and sample arms, respectively, the achromatic quarter wave plates adapted to rotate, upon double pass, the linear polarization of the transmitted light by 90°;
l) a dispersion compensating plate 29,129 inserted in the reference or sample arm of the system;
m) a liquid crystal retarder (LCR) 17,117 positioned in one of the following locations: before the polarization beam splitter 110 or after the beam splitter 10 in either the sample arm or in the reference arm; wherein, when positioned before the polarization beam splitter 110, the LCR is adapted to align the extraordinary axis 45 degrees with the direction of the incident polarization and, when located after the beam splitter 10, the LCR is adapted to align the extraordinary axis with the direction of the incident polarization;
n) mirrors 13,113 and 15,115 in the reference arm, the mirrors adapted to direct light from beam splitting device 10,110 through objective lens 14,114 and back to beam splitter 10,110;
o) a mirror 21,121 in the sample arm, the mirror adapted to allow a sample 20,120 to be attached to its front surface and to direct light from beam splitting device 10,110 through objective lens 19,119 and back to beam splitting device 10,110;
p) an analyzer 11,111 adapted to receive the two beams returning from mirrors 15,115 and sample 20,120 after they are recombined by passing through beam splitting device 10,110;
q) a tube lens 22,122 adapted to receive an interference signal from analyzer 11,111;
r) a parallel detector 23,123 adapted to receive the interference image projected onto it by tube lens 22,122;
s) a motorized stage 26,126 adapted to scan sample mirror 21,121;
t) a controller 25,125 adapted to control motorized stage 26,126;
u) a second voltage supply 24,124 adapted to control liquid crystal retarder 17,117;
v) a TTL unit 31,131 adapted to control first voltage supply unit 30,130, second voltage supply 24,124, and controller 25,125; and
w) a PC connected to TTL unit 31,131.

Embodiments of the system of the invention comprise an optical band pass filter 3,103 located before diffuser 4,104.

Embodiments of the system of the invention comprise a stop 27,127 adapted to block the reference arm of the system.

Embodiments of the system of the invention comprise an optical fiber 28,128 adapted to convey light emitted by the source to illuminate the sample when the reference arm is blocked so that the microscope can function as a bright field microscope in transmission.

In embodiments of the system of the invention the liquid crystal tunable filtering or variable retarder devices are replaced by one or more of: acoustooptic tunable filters, solid electrooptic crystal retardation modulators, polymer electrooptic retardation modulators, modulators and filters made of megnetooptic materials or fabry-perot tunable filters mechanically tuned with piezoelectric transducers or other microelectronic mechanical (MEMS) means.

In embodiments of the system of the invention the combination of using infinity corrected microscope objectives combined with a tube lens is replaced with the use of finite conjugate objectives without a tube lens.

In a second aspect the invention is a method of determining the envelope and phase of an interference signal obtained by using the interference microscopy three dimensional imaging system of the first aspect. The method comprising:
  a) supplying a system of the first aspect of the invention;
  b) activating the motorized stage to scan the sample mirror;
  c) modulating the signal with a liquid crystal tunable retarder to obtain one of:
    i) an image comprised of two $\pi/2$ phase shifted images from which an image obtained from a reference signal obtained by blocking the light from the sample has been subtracted;
    ii) three $\pi/2$ phase shifted images;
    iii) four $\pi/2$ phase shifted images;
  d) grabbing an image of the interference signal for each of the phases; and
  e) combining the grabbed images.

In a third aspect the invention is a method of obtaining optical coherence tomography images from interference signals obtained by using the interference microscopy three dimensional imaging system of the first aspect. The method comprising:
  a) supplying a system of the first aspect of the invention;
  b) not activating the motorized stage in order not to scan the sample mirror;
  c) modulating the transmitted wavelength of the light passing through the liquid crystal tunable filter;
  d) grabbing an image of the interference signal for each wavelength;
  e) saving the grabbed images in a first image stack; and
  f) applying the inverse Fourier transform operation to obtain the optical coherence tomography image.

The method of the third aspect can be modified by replacing step f) with the following:
  g) changing the phase of the liquid crystal tunable filter by $\pi/2$;
  h) modulating the transmitted wavelength of the light passing through the liquid crystal tunable filter;
  i) grabbing an image of the interference signal for each wavelength;
  j) saving the grabbed images in a second image stack;
  k) linearly combining the first and second image stacks; and
  l) applying the inverse Fourier transform operation to the combined image stack to obtain the optical coherence tomography image.

The modified method of the third aspect can be further modified by replacing step l) with the following:
  m) changing the phase of the liquid crystal tunable filter by $\pi/2$;
  n) modulating the transmitted wavelength of the light passing through the liquid crystal tunable filter;
  o) grabbing an image of the interference signal for each wavelength;
  p) saving the grabbed images in a third image stack;
  q) linearly combining the first, second, and third image stacks; and
  r) applying the inverse Fourier transform operation to the combined image stack to obtain the optical coherence tomography image.

The modified method of the third aspect can be even further modified by replacing step r) with the following:
  s) changing the phase of the liquid crystal tunable filter by $\pi/2$;
  t) modulating the transmitted wavelength of the light passing through the liquid crystal tunable filter;
  u) grabbing an image of the interference signal for each wavelength;
  v) saving the grabbed images in a fourth image stack;
  w) linearly combining the first, second, third, and fourth image stacks; and
  x) applying the inverse Fourier transform operation to the combined image stack to obtain the optical coherence tomography image.

All the above and other characteristics and advantages of the invention will be further understood through the following illustrative and non-limitative description of embodiments thereof, with reference to the appended drawings.

DETAILED DESCRIPTION OF EMBODIMENTS OF THE INVENTION

The present invention is a system and method that enable obtaining ultra-high resolution, true spectroscopic OCT images in high speed. The system does not use any mechanical moving elements for demodulating the interference signal. Two OCT operating modes are available; for ultra-high resolution the system allows either true spectroscopic TD-FF-OCT or wideband TD-FF-OCT imaging, whereas for high resolution and ultra-high speed the system allows FD-FF-OCT imaging. In the invention these two imaging modes are combined and therefore the invention benefits from the advantages inherent in each method.

By using LC devices in a unique integration scheme, the invention enables obtaining a dual mode FF-OCT and interference microscopy system which is quite compact, durable, relatively cheap, operating in high speed and in high resolution. The fact that a liquid crystal retarder(LCR) is used as the demodulating means holds an advantage over mechanically demodulating methods for it does not suffer from any mechanical inertia problems. Furthermore, in the mechanically demodulating method the phase shift is continuous and the OCT images are obtained by integration of the signal in the parallel detector. In this process significant errors may occur due to drifts in the integration time, a fact causing inaccurate reconstruction of the OCT images. Also, LCR can be constructed to have achromatic phase shift response which allow working with wideband illumination; this is not the case with Piezoelectric (PE) based modulating techniques as the phase shifts is strongly dependant on the wavelength.

The unique set up of the present invention reduces most of the stray light reflected form the optical surfaces along the illumination path. In addition, as compared with other FF-OCT methods for which polarization optics is used, one mode of the system of the invention exploits all the optical energy reflected from the sample. The inventors note that the dual mode operation of the invention allows benefiting from the advantages embedded both in the TD-FF-OCT and in the FD-FF-OCT imaging modes.

FIG. 1 schematically shows the Linnik like optical microscopy system used in the invention. The system shown is extremely flexible and allows the operator to interchange many of the components in order to achieve different imaging modes and to optimize the measuring results depending on the properties of the sample.

Light from a light source 1, e.g. a wideband light source, a thermal light source, and a halogen lamp, is projected onto an optical band pass filter 3 either by conventional optical elements or by propagating through an optical fiber bundle 2 as shown in the figure. Filter 3 can be any kind of optical band pass filter, e.g. an interference filter. In some modes of operation filter 3 can be pushed out of the optical path (as indicated by the double headed arrow) or be replaced with another type of filter according to the user's needs. A diffuser 4 is positioned after filter 3 and the diffused light is then condensed by condenser lens 5 onto the aperture stop 6 of the system. It is noted that here, as in the reference to other lenses in the system, lens 5 can be a single lens or a number of lenses that act together to perform the required function. As indicated by the double headed arrow aperture stop 6 can be exchanged with an optical mask 31 adapted to extend the depth of field of the objective lenses of the microscope. By means of the projecting lens 8 the aperture stop 6 is imaged to the back aperture plane of the objective lenses 14 and 19 in the sample and reference arms, respectively; whereas the field stop 7 is projected to the field, i.e. to the plane in which the object 20 is positioned and to the plane of reference mirror 15. The objective lenses 14 and 19 can be of any design, e.g. oil 16 immersion objectives.

The numerical aperture of the objective lenses 14 and 19 may be of any size; for example, in one configuration the numerical aperture is 1.25. The light transmitted through projecting lens 8 is polarized by a linear polarizer 32 before impinging on a liquid crystal tunable filter 9 with tuning range of at least 100 nm that is controlled by a voltage supplying unit 30. Linear polarizer 32 can be located either before filter 9, as shown, or after the filter. In some embodiments tunable filter 9 is a Fabre Perrot liquid crystal tunable filter. The light passing through tunable filter 9 splits at a beam splitter 10. In each of the interferometer arms an achromatic quarter wave plate 12 and 18 in the reference and sample arms, respectively, rotates, upon double pass, the linear polarization of the transmitted light by 90°. A dispersion compensating plate 29 is inserted in the reference arm of the microscope and a liquid crystal retarder (LCR) 17 is positioned in the sample arm so that the extraordinary axis is aligned with the direction of the linear polarization of the transmitted light. In an alternative configuration the LCR 17 is located in the reference arm. In this case, depending on the sample being investigated, there can be a plate 29 in the sample arm to compensate for dispersion at the sample. After reflection from the mirrors 13 and 15 in the reference arm and from the sample 20, the two beams are recombined in the beam splitter 10 and then transmitted towards an analyzer 11. A tube lens 22 is used to project the interference image onto a parallel detector 23, which can be, for example a CCD or CMOS camera. In order to obtain the interference images, the sample 20 is placed onto the sample mirror 21 and then scanned along the z axis by means of a linear motorized stage 26. In embodiments of the system, the motorized stage is connected to a controller 25, and the liquid crystal retarder 17 is connected to a second voltage supply 24. Both the liquid crystal devices and the controlled motorized stage along with the parallel detector are all controlled by a TTL unit 31 which is connected to a PC.

It is important to note that since polarizer 32 is perpendicular to analyzer 11, any stray light reflected form all the optical surfaces preceding the quarter wave plates is blocked. In addition, since the light polarization is rotated by 90°, the light transmitted through the liquid crystal retarder passes only once through the extraordinary axis thereby reducing its sensitivity to changes in the supplied voltage. From the system point of view this is an advantage as it means that a much simpler driver is needed for accurate operation of the device.

The optical system shown in FIG. 1 can be operated in several modes. When the LCR is not supplied with voltage, by scanning the sample along the z axis interference images of the sample are obtained. This can be done with or without the optical filters. When optical filters are not used, the system may be operated in the wideband TD-FF-OCT mode. When the filters are present the system is operating in the narrowband TD-FF-OCT mode. Note that by using the LCR at different phase shifts the OCT signal can be extracted for each of the operating modes. Note also that the system can be operated also in the Fourier domain mode by scanning different wavelengths with the liquid crystal tunable filter. In this mode the optical mask replaces the aperture stop. Finally, by blocking the reference arm of the microscope with a suitable stop 27, bright field images can be grabbed. The microscope bright field mode can also be operated in a transmission mode by illuminating the sample with light emitted from optical fiber 28. Note that by changing the aperture stop size, different effective numerical apertures can be used for imaging. In addition, by using different band pass filters, different wavelengths and different bandwidths can be used.

FIG. 2 schematically shows another embodiment the Linnik like optical microscopy system according to the present invention. Light from a light source 101, e.g. a halogen lamp or arc lamp, is projected onto an optical band pass filter 103 either by conventional optical elements or by propagating through an optical fiber bundle 102 as shown in the figure. Filter 103 can be any kind of optical band pass filter, e.g. an interference filter. In some modes of operation filter 103 can be pushed out of the optical path (as indicated by the double headed arrow) or be replaced with another type of filter according to the user's needs. A diffuser 104 is positioned after filter 103 and the diffused light is then condensed by condenser lens 105 onto the aperture stop 106 of the system. As indicated by the double headed arrow aperture stop 106 can be exchanged with an optical mask 131 adapted to extend the depth of field of the objective lenses of the microscope. By means of the projecting lens 108 the aperture stop 106 is imaged to the back aperture plane of the objective lenses 114 and 119 in the sample and reference arms respectively; whereas the field stop 107 is projected to the back focal plane of the objectives, the field stop 7 is projected to the field, i.e. to the plane in which the object 120 is located and to the plane of reference mirror 115. The objective lenses 114 and 119 can be of any design, e.g. oil 116 immersion objectives. The numerical aperture of the objective may be of any size; for example, in one configuration the numerical aperture is 1.25.

The light transmitted through the lens 108 is filtered by a liquid crystal tunable filter 109 with tuning range of at least 100 nm that is controlled by a voltage supplying unit 130. In some embodiments tunable filter 109 is a Fabre Perrot liquid crystal tunable filter. The light passing through tunable filter 109 passes onto a linear polarizer 132 which is oriented at 45° to the optical axis of the LCR 117. The light passing element 117 is split into two orthogonal polarizations by polarization beam splitter 110. In each of the interferometer arms a quarter wave plate 112 and 118 in the reference and sample arms, respectively rotates the linear polarization of the transmitted light by 90°. A dispersion compensating plate 129 is inserted in the reference arm of the microscope. In some embodiments a liquid crystal retarder 117 is positioned in front of the analyzer 111. Analyzer 111 can optionally positioned so that the transmitted linear polarization is parallel to the transmitted polarization of linear polarizer 132. In alternative embodiments the polarizations of analyzer 111 and polarizer 132 are perpendicular. After reflection from the reference mirrors 113 and 115, and the sample 120, the two beams are recombined in the polarization beam splitter 110 and then transmitted towards an analyzer 111. The tube lens 122 is used to project the interference image of the projection of the polarized waves onto a parallel detector 123, which can be, for example, a CCD or CMOS camera. In order to obtain the interference images, the sample 120 is positioned on the sample mirror 121 and then scanned along the z axis with the linear motorized stage 126. In embodiments of the invention, the motorized stage is connected to a controller 125, and the liquid crystal retarder is connected to a second voltage supplying 124. Both the liquid crystal devices and the controlled motorized stage along with the parallel detector are all controlled by a TTL unit 131 which is connected to a PC.

The optical system shown in FIG. 2 can be operated in several modes. When the LCR is not supplied with voltage, interference images of the sample are obtained by scanning the sample along the z axis. This can be done with or without the optical filters. When the optical filters are not used, the system may be operated in the wideband TD-FF-OCT mode. When the filters are used, the system is operating in the narrowband TD-FF-OCT mode. Note that by using the LCR at different phase shifts the OCT signal can be extracted for each of the operating modes. Note also that the system can be operated in the Fourier domain mode by scanning different wavelengths with the liquid crystal tunable filter. In this mode, however, an optical mask replaces the aperture stop. Finally, by blocking the reference arm of the microscope with a suitable stop 127, bright field images can be grabbed. The microscope bright field mode can also be operated in a transmission mode by illuminating the sample with light passing through and exiting optical fiber 128. By changing the aperture stop size, different effective numerical apertures can be used for imaging. In addition, by using different band pass filters, different wavelengths and different bandwidths can be used.

Without loss of generality other tunable filtering or variable retarder devices can be used instead of liquid crystal type devices. Examples include acoustooptic tunable filters, solid electrooptic crystal retardation modulators, polymer electrooptic retardation modulators, modulators and filters made of magnetooptic materials or fabry-perot tunable filters mechanically tuned with piezoelectric transducers or other microelectronic mechanical (MEMS) means.

Although the combination of using infinity corrected microscope objectives combined with a tube lens is the preferable option, other options are possible for example the use of finite conjugate objectives without a tube lens. This latter option is sometimes preferable for compactness reasons. The objective can be made of a single lens, or a combination of lenses arranged to minimize aberrations.

The narrowband full-field interference output signal of a single microstructure located within a weakly attenuating sample is given by eqn. 1 [29]. For simplicity, it is assumed that an index matching material is used with the objectives. In eqn. 1: $I_o$ is the DC level, $\gamma$ is the contrast (eqn. 2), A is the axial response (envelope) function (eqn. 3), $\Delta z$ is the scanning distance, l is the distance of the microstructure from the sample top surface, $f_z$ is the axial spatial carrier frequency (eqn. 4), and $\beta$ is the phase delay imposed by the LCR (eqn. 5).

$$I(x', y', \Delta z, \beta) \approx \quad (1)$$
$$I_0(x, y) \times \{1 + \gamma(x, y)A[\Delta z - \ell(x, y)]\cos\{2\pi f_z[\Delta z - \ell(x, y)] + \beta\}\}$$

$$\gamma(x, y) = 2\sqrt{R_R R_S(x, y, \ell)}/[R_{scat}(x, y) + R_R + R_{Stotal}(x, y)] \quad (2)$$

$$A[\Delta z - \ell(x, y)] = \mathrm{sinc}\left\{\frac{n_0 NA^2 \pi}{\lambda}[\Delta z - \ell(x, y)]\right\} \quad (3)$$

$$f_z = \frac{n_0}{\lambda/2}(1 - NA^2/4) \quad (4)$$

$$\beta = \frac{2\pi}{\lambda}[n_o + n_e(V)]d \quad (5)$$

In eqn. 1: (x, y) and (x', y') are the lateral coordinates in the object and image space, respectively. In eqn. 2: $R_R$ is the reference reflectivity, $R_S$ is the sample microstructure reflectivity, $R_{Stotal}$ and $R_{scat}$ are the total reflectivity coefficients of all resolvable and irresolvable microstructures, respectively. In eqns. 3-4: $n_0$ is the index matching material and NA is the numerical aperture in air. In eqn. 5: d is the thickness of the LCR cell whereas $n_o$ and $n_e(V)$ are the LC ordinary and extraordinary refraction indices, respectively. Note that the extraordinary index is voltage dependent and hence, by varying the applied voltage different phase shifts β are obtained.

By changing the LCR phase from β=2π to β=1.5π and then to β=π the narrowband TD-FF-OCT signal for each point of the object (x,y) is obtained, see eqns. 6-9:

$$C(\Delta z)=[I(\Delta z, 2\pi)-I(\Delta z,\pi)]/2=I_0\gamma A(\Delta z-l)\cos[2\pi f_z(\Delta z-l)] \quad (6)$$

$$DC=[I(2\pi)+I(\pi)]/2=I_0 \quad (7)$$

$$S(\Delta z)=I(\Delta z, 1.5\pi)-DC=I_0\gamma A(\Delta z-l)\sin[2\pi f_z(\Delta z-l)] \quad (8)$$

$$E_{nfc}(\Delta z)=\sqrt{S(\Delta z)^2+C(\Delta z)^2}=I_0\gamma A(\Delta z-l) \quad (9)$$

Eqn. 9 represents the en-face OCT signal for each point of the object (x,y) in each depth of the scan Δz. By accumulating N images of each phase, the SNR and sensitivity of the system are enlarged. In this respect, it is important to note that since in TD-FF-OCT the SNR is proportional to the square of the contrast [18], high contrast signals drastically reduce the necessary number of images N and therefore significantly improve the imaging speed. It is also observed that the OCT signal along the axial direction has the form of a sinc function. In order to reduce the artifacts produced by the side lobes, an axial scaling process is performed according to eqn. 10.

$$XS_{image}(\Delta z)=\max[E_{nfc}(\Delta z)]\times\{E_{nfc}(\Delta z)/\max[E_{nfc}(\Delta z)]\}^2 \quad (10)$$

An alternative scaling process by which the cross sectional image is reconstructed is to take the logarithm of the square of eqn. 9. Then, the data in the cross sectional image is assigned with an 8 bit gray scale map. The phase of the interference signal can also be obtained by using equation 11:

$$\mathrm{Phase}(\Delta z) = tg[S(\Delta z)/C(\Delta z)]^{-1} = 2\pi f_z(\Delta z-\ell) - (2m+1)\frac{\pi}{2} \quad (11)$$

It should be mentioned that the algorithm is extendable to the case of more than 3 phase differences and the SNR improves proportionally to the number of phase difference sets.

When using an objective lens without index matching material, such as free air objectives, the construction of the cross sectional image of the image must take into account defocusing effects resulting from refraction. In this case, the scanning space of the sample is to be corrected according to eqn. 12 [29]:

$$\Delta z(x, y)_{peak_N} = \sum_{i=0}^{M-1} \ell_i(x, y)(n_0/n_i) \quad (12)$$

In eqn. 12 the $M^{th}$ peak corresponds to the $M^{th}$ microstructure and $l_i(x, y)$ is being the thickness of the $i_{th}$ layer with $l_0(x, y)=0$. For a uniform monolayer and free air objectives this result reduces to $\Delta z_{Peak_2}=1/n$. These results are evidently true in light of the experimental results depicted in FIGS. 3-4.

The demodulation process described above can be also implemented in a four phase quadruplet technique. Here, the phase is changed from β=2π to β=1.5π and then to β=π and finally to β=0.5π. The narrowband TD-FF-OCT signal for each point of the object (x,y) is then obtained through the following equations (eqns. 13-15):

$$C(\Delta z)=[I(\Delta z, 2\pi)-I(\Delta z,\pi)]/2=I_0\gamma A(\Delta z-l)\cos[2\pi f_z(\Delta z-l)] \quad (13)$$

$$S(\Delta z)=I(\Delta z, 1.5\pi)-I(\Delta z, 0.5\pi)=I_0\gamma A(\Delta z-l)\sin[2\pi f_z(\Delta z-l)] \quad (14)$$

$$E_{nfc}(\Delta z)=\sqrt{S(\Delta z)^2+C(\Delta z)^2}=I_0\gamma A(\Delta z-l) \quad (15)$$

The phase and the cross section image can be reconstructed according to the same process described above in the case of three phase shifts.

When the wideband illumination mode is operated, the NA of the objective lens is considerably lower than the temporal coherence length. Under these circumstances, the envelope function of the interference output signal is assumed flat. In this case, the output signal for each wavelength is given by the expression (eqn.16):

$$I(x', y', \Delta z, \beta) \approx I_0(x, y) \times \{1 \times \gamma(x, y)\cos[2\pi f_z[\Delta z - \ell(x, y)] + \beta]\} \quad (16)$$
$$= I_0(x, y) \times \left\{1 + \gamma(x, y)\cos\left\{2\pi \frac{n_0}{\lambda/2}(1 - NA^2/4)\right.\right.$$
$$\left.\left.\left\{2\pi \frac{n_0}{\lambda/2}(1 - NA^2/4)[\Delta z - \ell(x, y)] + \beta\right\}\right\}\right.$$
$$= I_0(x, y) \times \{1 + \gamma(x, y)\cos$$
$$\left\{2\pi f \frac{2n_0}{c}(1 - NA^2/4)[\Delta z - \ell(x, y)\beta]\right\}$$
$$= I_0(x, y) \times [1 + \gamma(x, y)\cos(2\pi f\tau + \beta)]$$

With, $$\tau = \frac{2n_0}{c}(1 - NA^2/4)[\Delta z - \ell(x, y)] \quad (17)$$

For a Gaussian like spectra, the overall interference signal is thus obtained by all the spectral components contribution, that is:

$$I(x',y',\Delta z,\beta) \approx \int I_0(x,y,f) \times [1+\gamma(x,y)\cos(2\pi f\tau+\beta)]df \quad (18)$$

With, $$I_0(x,y,f)=I_{00}(x,y)\exp[-(f-f_0)^2/2\sigma_f^2] \quad (19)$$

With $f_0 = c/\lambda_0$ being the central frequency of the source and $\sigma_f \sim \sigma_\lambda/\lambda_0^2$ the variance of the spectra. Equation 19 is solvable:

$$I(x', y', \Delta z, \beta) \approx \qquad (20)$$
$$I_{00}(x, y) \times \{1 + \gamma(x, y) A[\Delta z - \ell(x, y)] \cos\{2\pi f_z [\Delta z - \ell(x, y)] + \beta\}\}$$

With, $$A[\Delta z - \ell(x, y)] = \exp\left(-2\left[2\pi n_0 \frac{\sigma_\lambda}{\lambda_0^2}(1 - NA^2/4)[\Delta z - \ell(x, y)]\right]\right) \qquad (21)$$

The envelope and phase of the signal can be obtained in the same fashion as described above for the narrowband operation mode. It is noted that in this case a lower NA objective can be used; however, the axial resolution can be as high as the narrowband case with a more efficient out of focus light rejection.

The last operating mode is the Fourier domain mode. In this case the parallel detector is used to grab images of a plurality of wavelengths. Each image is taken with a different wavelength. Then the inverse Fourier transform (IFT) operation is used to obtain the cross section images. Optionally, the wavelength scan is conducted 4 times, each with different phase difference of the LCR; the phase is changed from $\beta = 2\pi$ to $\beta = 1.5\pi$ and then to $\beta = \pi$ and finally to $\beta = 0.5\pi$. Optionally, the frequency transmission spectra of the filter and the detector photon response are used to correct the signal for inhomogeneity. The OCT signal is therefore calculated from the following equation:

$$M\gamma I_0 A[\Delta z - l(x,y)] = |\tfrac{1}{2}\!\int[(\bar{I}_{\beta=2\pi} - \bar{I}_{\beta=\pi}) + j(\bar{I}_{\beta=1.5\pi} - \bar{I}_{\beta=0.5\pi})]e^{j2\pi f t}df| \qquad (22)$$

In this operation mode the aperture stop is swapped with the depth of field optical mask. It is to be noted that the signal intensity is enlarged by the number of spectral component M and that in this embodiment of the method of the invention the problems of: (i) strong zero order, (ii) twin mirror image, and (iii) short depth of imaging which are usually apparent in the FF-OCT mode have been overcome.

In other embodiments, only two phase shifts are used mutatis mutandis to calculate the OCT signal.

Figure 3:
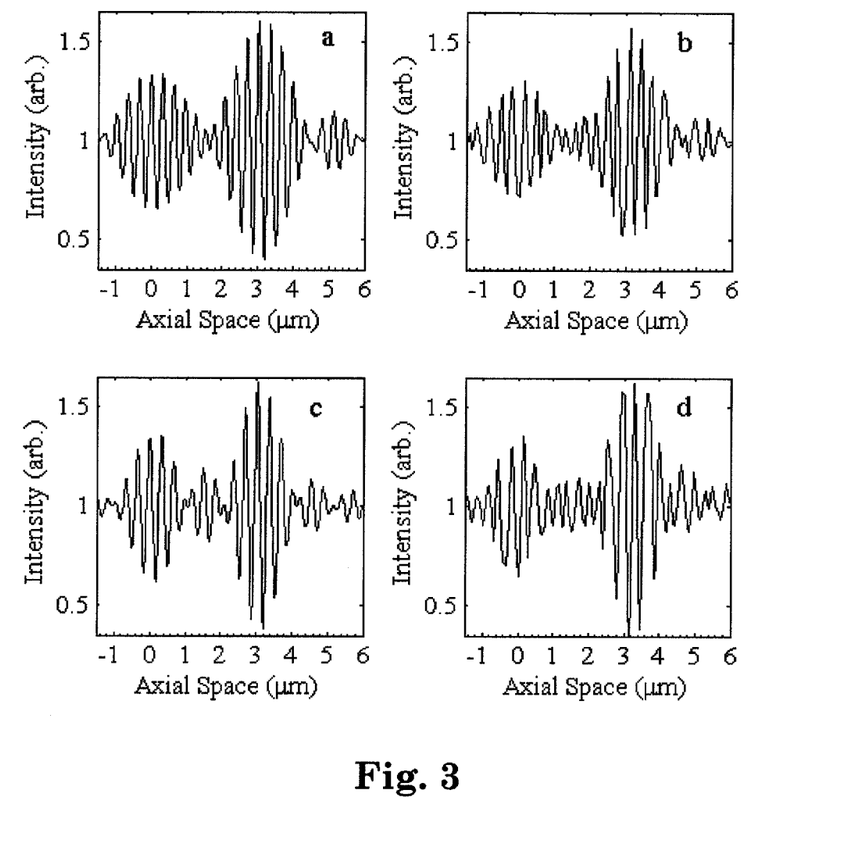
FIG. 3 is a comparison between experimental and theoretical results of a thin film measurement using different numerical apertures.

FIG. 3 shows a comparison of a simulation of eqn. 1 and actual experimental results obtained when using the system as an ordinary interference microscope. Both the simulation and experiment use a 4.8 μm SiO$_2$ thin film on Si substrate using an objective lens with two different effective NAs and a narrow band light source with center wavelength at 580 nm and FWHM of 10 nm. The upper left quadrant of FIG. 3 (labeled a) is the simulation with a NA=0.65. The upper right quadrant of FIG. 3 (labeled b) is the experimental result with a NA of ~0.65. The lower left quadrant of FIG. 3 (labeled c) is the simulation with a NA=0.75. The lower right quadrant of FIG. 3 (labeled d) is the experimental result with a NA of ~0.75.

Figure 4:
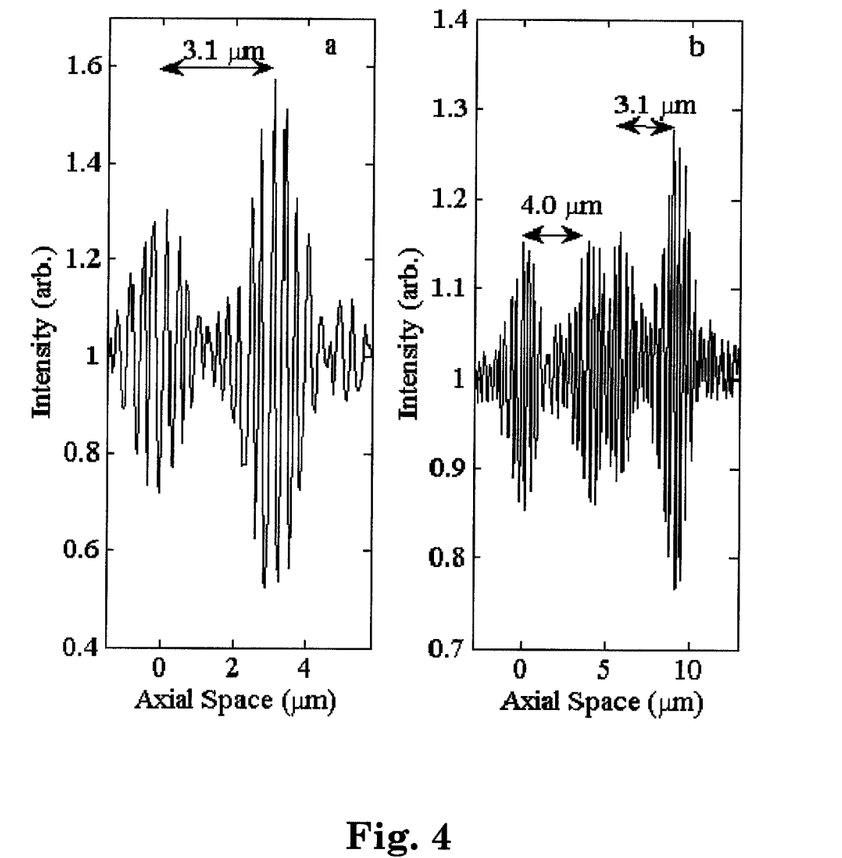
FIG. 4 shows the experimental fringe pattern obtained when measuring a thin film and a multilayer sample under different spatial coherence conditions.

FIG. 4 shows an example of an experimental result obtained from: (left side of FIG. 4, labeled a) a 4.8 μm SiO$_2$ thin film on Si substrate and (right side of FIG. 4, labeled b) a multilayer sample comprised of a 6 μm Mylar sheet first layer, a second layer of free air, and a 4.8 μm third layer of SiO$_2$ on a Si substrate. The experiment demonstrates how the physical thickness of a layer can be obtained based on the interference output signal and the theoretical model described herein. The refraction indices of the material of the above layers are as follows: $n_{Mylar} = 1.6$, $n_{air} = 1$, $n_{SiO2} = 1.54$.

Figure 5:
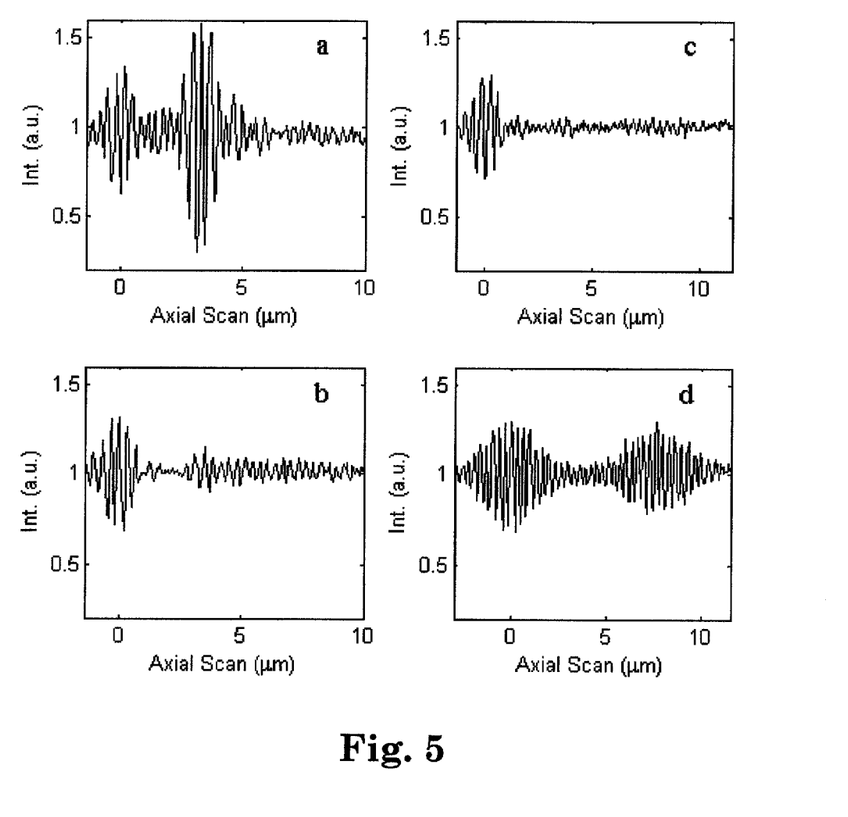
FIG. 5 shows the experimental fringe pattern obtained when measuring a thin film under different spatial and temporal coherence conditions.

FIG. 5 shows experimental results obtained from a 4.8 μm SiO2 thin film on Si substrate measured using different spatial and temporal coherence lengths. The central wavelength in these experiment is $\lambda = 580$ nm. In the upper left image (labeled a) $NA_{eff} \sim 0.8$, FWHM=10 nm; in the lower left image (labeled b) $NA_{eff} \sim 0.8$, FWHM=30 nm; in the upper right image (labeled c) $NA_{eff} \sim 0.8$, FWHM=55 nm; and in the lower right image (labeled) $NA_{eff} \sim 0.3$, FWHM=55 nm. The experiments demonstrate the advantage of using narrowband illumination when high NA is used, i.e. high signal contrast is obtained. However, the experiment also demonstrates that when using low NA objectives a more efficient impulse response function is obtained by using the wideband illumination; no side lobes are apparent, therefore image artifacts are minimized. FIG. 5 demonstrates why it is desirable to have both the narrowband and the wideband operation modes available.

Figure 6:
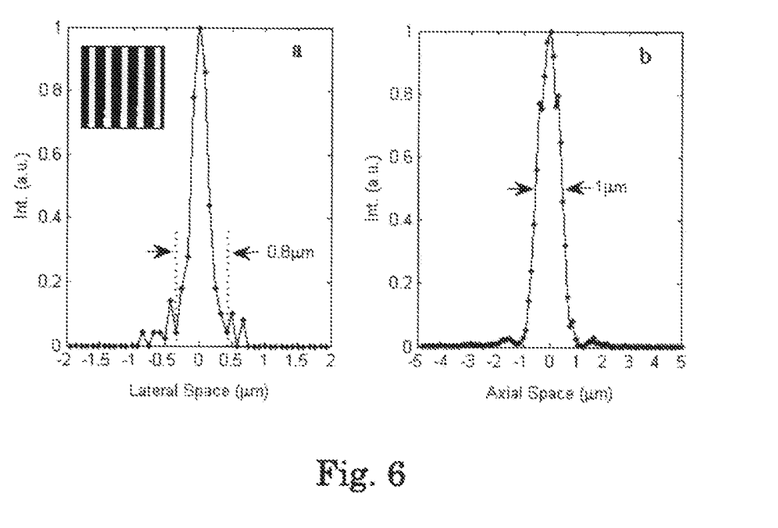
FIG. 6 shows the lateral resolution of the system and demodulated OCT signal obtained by the method of the invention.

FIG. 6 shows an example of the optical system resolution obtained when using a 1.25 NA (nominal) oil immersion objectives and a narrowband light source with $\lambda = 710$ nm and $\Delta\lambda_{FWHM} = 10$ nm. The image on the left (labeled a) shows the derivative of the edge spread function (ESF) obtained from a Ronchi rulings target (shown in the top left corner, bright field image) with 200 lp/mm. The right image (labeled b) shows the axial response of the OCT system obtained by the demodulation process. The effective NA of the system is ~1.05 corresponding to an Airy disk radius of a ~0.4 μm.

Figure 7:
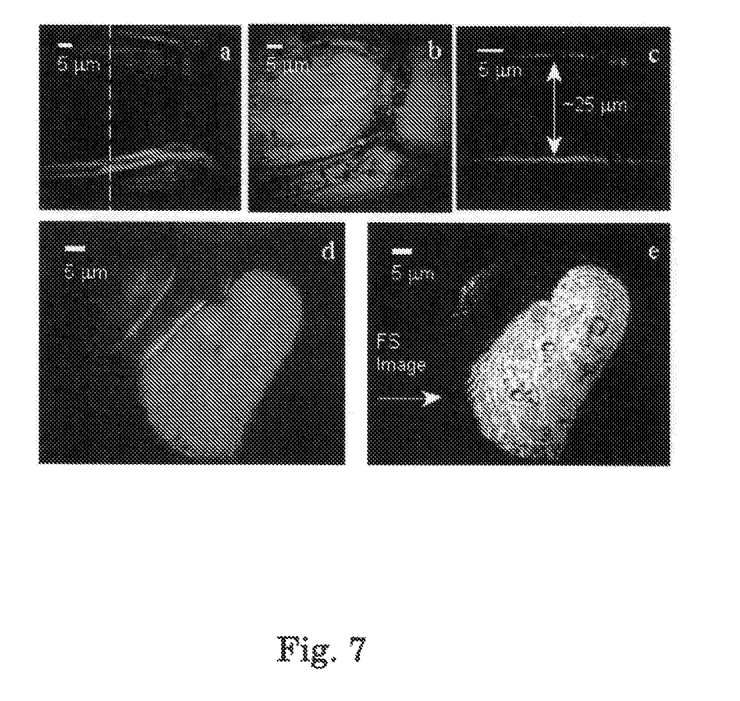
FIG. 7 is a typical example of the high resolution OCT images obtained by the method of the invention.

FIG. 7 shows screen shots obtained when imaging biological samples with high resolution. In this example the images are of a single layer of an onion epithelium positioned on top of a microscope slide. The top left image (labeled a) is a narrowband ($\lambda = 710$ nm, $\Delta\lambda_{FWHM} = 10$ nm) OCT en-face image showing the boundaries (walls) of few cells, top surface. The white dashed line designates the location of the cross section image. The top middle image (labeled b) is a bottom surface image showing the deformed onion cells boundary with the underlying microscope slide. The top right image (labeled c) is cross section image showing the profile of the cell with scanning steps of 0.5 μm. The lower left image (labeled d) is a bright field image of the largest organelle in an onion cell, possibly the nucleus. The lower right image (labeled e) is a narrowband ($\lambda = 580$ nm, $\Delta\lambda = 10$ nm) OCT image of the same scene of FIG. 4d.

Figure 8:
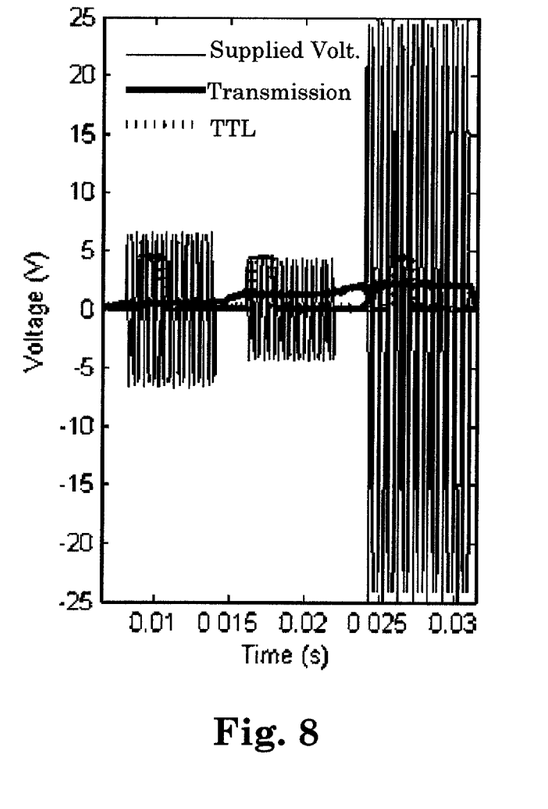
FIG. 8 shows a timing diagram measurement of the signal in the system for one high speed phase shifting mode.

FIG. 8 shows a timing diagram measurement of the signal in the system for one high speed phase shifting mode. Three different signals are shown in FIG. 8. As can be seen in the figure, three different voltage levels with high frequency carriers are supplied; for each phase a different voltage level is applied. Between these voltage levels there are "turn-off" breaks in the supplied voltage. The "Transmission" signal is the optical signal converted to voltage by a silicon photo diode. This signal is obtained by putting the LCR between two polarizers and measuring the transmitted signal while applying the "Supplied Volt" signal. The diagram shows that the LCR reaches saturation for each phase in very high speed. The "TTL" signal shows when the camera trigger input is interrupted. Each TTL pulse is used to instruct the camera to grab as image. The three images are then used to generate the OCT signal.

Although embodiments of the invention have been described by way of illustration, it will be understood that the invention may be carried out with many variations, modifications, and adaptations, without exceeding the scope of the claims.

BIBLIOGRAPHY

1. D. Huang, E. A. Swanson, C. P. Lin, J. S. Schuman, W. G. Stinson, W. Chang, M. R. Hee, T. Flotte, K Gregory, C. A. Puliafito, J. G. Fujimoto, "Optical Coherence Tomography", Science, 254, 1178-1181 (1991).
2. P. H Tomlins and R. K Wang, "Theory, developments and applications of optical coherence tomography," J. Phys. D: Appl. Phys. 38, 2519-2535 (2005).
3. Johannes F. de Boer, Barry Cense, B. Hyle Park, Mark C. Pierce, Guillermo J. Tearney, and Brett E. Bouma, "Improved signal-to-noise ratio in spectral-domain compared with time-domain optical coherence tomography", Opt. Lett., 28, 2067-2069 (2003).
4. W. Drexler, U. Morgner, F. X. Kartner, C. Pitris, S. A. Boppart, X. D. Li, E. P. Ippen, and J. G. Fujimoto, "In vivo ultrahigh-resolution optical coherence tomography", Opt. Lett., 24, 1221-1223 (1999).
5. B. Povazay, K. Bizheva, A. Unterhuber, B. Hermann, H. Sattmann, A. F. Fercher, and W. Drexler, A. Apolonski, W. J. Wadsworth, J. C. Knight, and P. St. J. Russell, M. Vetterlein and E. Scherzer "Submicrometer axial resolution optical coherence tomography", Opt. Lett. 27, 1800-1802 (2002).
6. L. Vabre, A. Dubois and A. C. Boccara, "Thermal-light full-field optical coherence tomography", Opt. Lett., 27, 530-532 (2002).
7. A. Dubois, K. Grieve, G. Moneron, R. Lecaque, L. Vabre and C. Boccara, "Ultrahigh-resolution full-field optical coherence tomography", App. Opt., 43, 2674-2883 (2004).
8. B. E. Bouma, G. J. Tearney, "Handbook of Optical Coherence Tomography", Marcel Dekker (2002).
9. H. Kakuma, K. Ohbayashi, Y. Arakawa, "Optical imaging of hard and soft dental tissues using discretely swept optical frequency domain reflectometry optical coherence tomography at wavelengths from 1560 to 1600 nm", Journal of Biomedical Optics, 13, 014012-1-014012-6 (2008).
10. Y. Watanabe, M. Sato "Three-dimensional wide-field optical coherence tomography using an ultrahigh-speed CMOS camera", Opt. Comm., 281, 1889-1895 (2008).
11. P. de Groot, X. Colonna de Lega, "Signal modeling for low-coherence height-scanning interference microscopy," Appl. Opt. 43, 4821-4830 (2004).
12. E. Beaurepaire, A. C. Boccara, M. Lebec, L. Blanchot, and H. Saint-Jalmes, "Full-field optical coherence microscopy," Opt. Lett. 23, 244-246 (1998).
13. W. Krug, J. Rienitz and G. Schultz (eds), *Contributions to Interference Microscopy* (Hilger and Watts, London 1964).
14. M. Davidson, K. Kaufman, I. Mazor, and F. Cohen, "An application of interference microscopy to integrated circuit inspection and metrology," in *Integrated Circuit Metrology, Inspection, and Process Control*, K. M. Monahan, ed., Proc. SPIE 775, 233-247 (1987).
15. G. S. Kino and S. S. C. Chim, "Mirau correlation microscope," App. Opt. 29, 3775-3783 (1990).
16. D. Gale, M. I. Pether, and J. C. Dainty, "Linnik microscope imaging of integrated circuit structures," Appl. Opt. 35, 131-148 (1996).
17. L. Vabre, A. Dubois, A. C. Boccara, "Thermal-light full-field optical coherence tomography", Opt. Lett., 27, 530-532 (2002).
18. A. Dubois, L. Vabre, A. C. Boccara, E. Beaurepaire, "High-resolution full-field optical coherence tomography with a Linnik microscope", App. Opt., 41, 805-812 (2002).
19. M. Akiba, K. P. Chan, and N. Tanno, "Full-field optical coherence tomography by two-dimensional heterodyne detection with a pair of CCD cameras", Opt. Lett., 28, 816-818 (2003).
20. G. Moneron, A. C. Boccara, and A. Dubois, "Stroboscopic ultrahigh-resolution full-field optical coherence tomography", Opt. Lett., 30, 1351-1353 (2005).
21. L. Yu, M. K. Kim, "Full-color three-dimensional microscopy by wide-field optical coherence tomography", Opt. Express, 12, 6632-6641 (2004).
22. Y. Watanabe, Y. Hayasaka, M. Sato, N. Tanno, "Full-field optical coherence tomography by achromatic phase shifting with a rotating polarizer", App. Opt., 44, 1387-1392 (2005).
23. G. Moneron, A. C. Boccara, A. Dubois, "Polarization-sensitive full-field optical coherence tomography", Opt. Lett., 32, 2058-2060 (2007).
24. M. Kinoshita, M. Takeda, H. Yago, Y. Watanable, and T. Kurokawa, "Optical frequency-domain imaging microprofilometry with a frequency-tunable liquid-crystal Fabry-Perot etalon device," Appl. Opt. 38, 7063-7068 (1999).
25. B. Považay, A. Unterhuber, B. Hermann, H. Sattmann, H. Arthaber, W. Drexler "Full-field time-encoded frequency-domain optical coherence tomography", Opt. Exp., 14, 7662-7669 (2006).
26. S. K. Dubey, T. Anna, C. Shakher, D. S. Mehta, "Fingerprint detection using full-field swept-source optical coherence tomography", App. Phs. Lett., 91, 181106-181106-3 (2007).
27. S. K. Dubey, D. S. Mehta, A. Anand, C. Shakher, "Simultaneous topography and tomography of latent fingerprints using full-field swept-source optical coherence tomography", J. Opt. A, 10, 015307 (2008).
28. T. Bonin, G. Franke, M. H. Eggert, P. Koch, G. Hüttmann1, "In vivo Fourier-domain full-field OCT of the human retina with 1.5 million A-lines/s", Opt. Lett., 35, 3432-3434 (2010).
29. A. Safrani, I. Abdulhalim, "Spatial coherence effect on layers thickness determination in narrowband full field optical coherence tomography", App. Opt., 50, 3021-3027 (2011)
30. U.S. Pat. No. 6,940,602 (Dubois et al)
31. U.S. Pat. No. 7,095,503 (Kim et al)
32. U.S. Pat. No. 7,088,454 (Chang et al)
33. U.S. Pat. No. 7,950,801 (Lacombe et al)
34. US 2009/0153876 (Chan et al)
35. U.S. Pat. No. 4,818,110 (Davidson et al.)
36. U.S. Pat. No. 5,194,918 (Kino et al)
37. U.S. Pat. No. 7,468,799 B2 (de Groot et al)
38. US 2011/0181888 A1 (Abdulhalim et al)

The invention claimed is:
1. An interference microscopy three dimensional imaging system comprising:
a) a light source;
b) a diffuser adapted to diffuse light received from the light source;
c) a condenser lens adapted to condense diffused light received from diffuser;
d) one of an aperture stop or an optical mask adapted to extend the depth of field of the objective lenses of a sample arm and a reference arm of said system respectively;
e) a field stop;
f) a projecting lens adapted to image one of aperture stop or optical mask to the back aperture planes of objective lenses and to image field stop to the plane of the object and to the plane of reference mirror;
g) a linear polarizer adapted to polarize the light transmitted through projecting lens;
h) a liquid crystal tunable filter adapted to receive light that has passed through linear polarizer;
i) a first voltage supply unit adapted to control liquid crystal tunable filter;

j) a beam splitting device adapted to split the light passing through tunable filter into two beams;
k) achromatic quarter wave plates in the reference and sample arms, respectively, the achromatic quarter wave plates adapted to rotate, upon double pass, the linear polarization of the transmitted light by 90°;
l) a dispersion compensating plate inserted in the reference or sample arm of the system;
m) a liquid crystal retarder (LCR) positioned in one of the following locations: before the polarization beam splitter or after the beam splitter in either the sample arm or in the reference arm; wherein, when positioned before the polarization beam splitter, the LCR is adapted to align the extraordinary axis 45 degrees with the direction of the incident polarization and, when located after the beam splitter, the LCR is adapted to align the extraordinary axis with the direction of the incident polarization;
n) mirrors in the reference arm, the mirrors adapted to direct light from beam splitting device through objective lens and back to beam splitter;
o) a mirror in the sample arm, the mirror adapted to allow a sample to be attached to its front surface and to direct light from beam splitting device through objective lens and back to beam splitting device;
p) an analyzer adapted to receive the two beams returning from mirrors and sample after they are recombined by passing through beam splitting device;
q) a tube lens adapted to receive an interference signal from analyzer;
r) a parallel detector adapted to receive the interference image projected onto it by tube lens;
s) a motorized stage adapted to scan sample mirror;
t) a controller adapted to control motorized stage;
u) a second voltage supply adapted to control liquid crystal retarder;
v) a TTL unit adapted to control first voltage supply unit, second voltage supply, and controller; and
w) a PC connected to TTL unit.

2. The system of claim 1, comprising an optical band pass filter located before diffuser.

3. The system of claim 1, comprising a stop adapted to block the reference arm of the system.

4. The system of claim 1, comprising optical fiber adapted to convey light emitted by the source to illuminate the sample for bright field imaging in transmission mode.

5. The system of claim 1, wherein the liquid crystal tunable filtering or variable retarder devices are replaced by one or more of: acoustooptic tunable filters, solid electrooptic crystal retardation modulators, polymer electrooptic retardation modulators, modulators and filters made of magnetooptic materials or fabry-perot tunable filters mechanically tuned with piezoelectric transducers or other microelectronic mechanical systems (MEMS) means.

6. The system of claim 1, wherein the combination of using infinity corrected microscope objectives combined with a tube lens is replaced with the use of finite conjugate objectives without a tube lens.

7. A method of determining the envelope and phase of an interference signal obtained by using the interference microscopy three dimensional imaging system of claim 1, said method comprising:
a) supplying a system according to claim 1;
b) activating the motorized stage to scan the sample mirror;
c) modulating the signal with a liquid crystal tunable retarder to obtain one of:
i) an image comprised of two $\pi/2$ phase shifted images from which an image obtained from a reference signal obtained by blocking the light from the sample has been subtracted;
ii) three $\pi/2$ phase shifted images;
iii) four $\pi/2$ phase shifted images;
d) grabbing an image of the interference signal for each of the phases; and
e) combining the grabbed images.

8. A method of obtaining optical coherence tomography images from interference signals obtained by using the interference microscopy three dimensional imaging system of claim 1, said method comprising:
a) supplying a system according to claim 1;
b) not activating the motorized stage in order not to scan the sample mirror;
c) modulating the transmitted wavelength of the light passing through the liquid crystal tunable filter;
d) grabbing an image of the interference signal for each wavelength;
e) saving the grabbed images in a first image stack; and
f) applying the inverse Fourier transform operation to obtain the optical coherence tomography image.

9. The method of claim 8, comprising replacing step f) with the following:
g) changing the phase of the liquid crystal tunable filter by $\pi/2$;
h) modulating the transmitted wavelength of the light passing through the liquid crystal tunable filter;
i) grabbing an image of the interference signal for each wavelength;
j) saving the grabbed images in a second image stack;
k) linearly combining the first and second image stacks; and
l) applying the inverse Fourier transform operation to the combined image stack to obtain the optical coherence tomography image.

10. The method of claim 9, comprising replacing step l) with the following:
m) changing the phase of the liquid crystal tunable filter by $\pi/2$;
n) modulating the transmitted wavelength of the light passing through the liquid crystal tunable filter;
o) grabbing an image of the interference signal for each wavelength;
p) saving the grabbed images in a third image stack;
q) linearly combining the first, second, and third image stacks; and
r) applying the inverse Fourier transform operation to the combined image stack to obtain the optical coherence tomography image.

11. The method of claim 10, comprising replacing step r) with the following:
s) changing the phase of the liquid crystal tunable filter by $\pi/2$;
t) modulating the transmitted wavelength of the light passing through the liquid crystal tunable filter;
u) grabbing an image of the interference signal for each wavelength;
v) saving the grabbed images in a fourth image stack;
w) linearly combining the first, second, third, and fourth image stacks; and
x) applying the inverse Fourier transform operation to the combined image stack to obtain the optical coherence tomography image.

* * * * *